May 3, 1949. L. A. MAPES Re. 23,107
EXTENSIBLE CONVEYER
Original Filed April 17, 1946 2 Sheets-Sheet 1
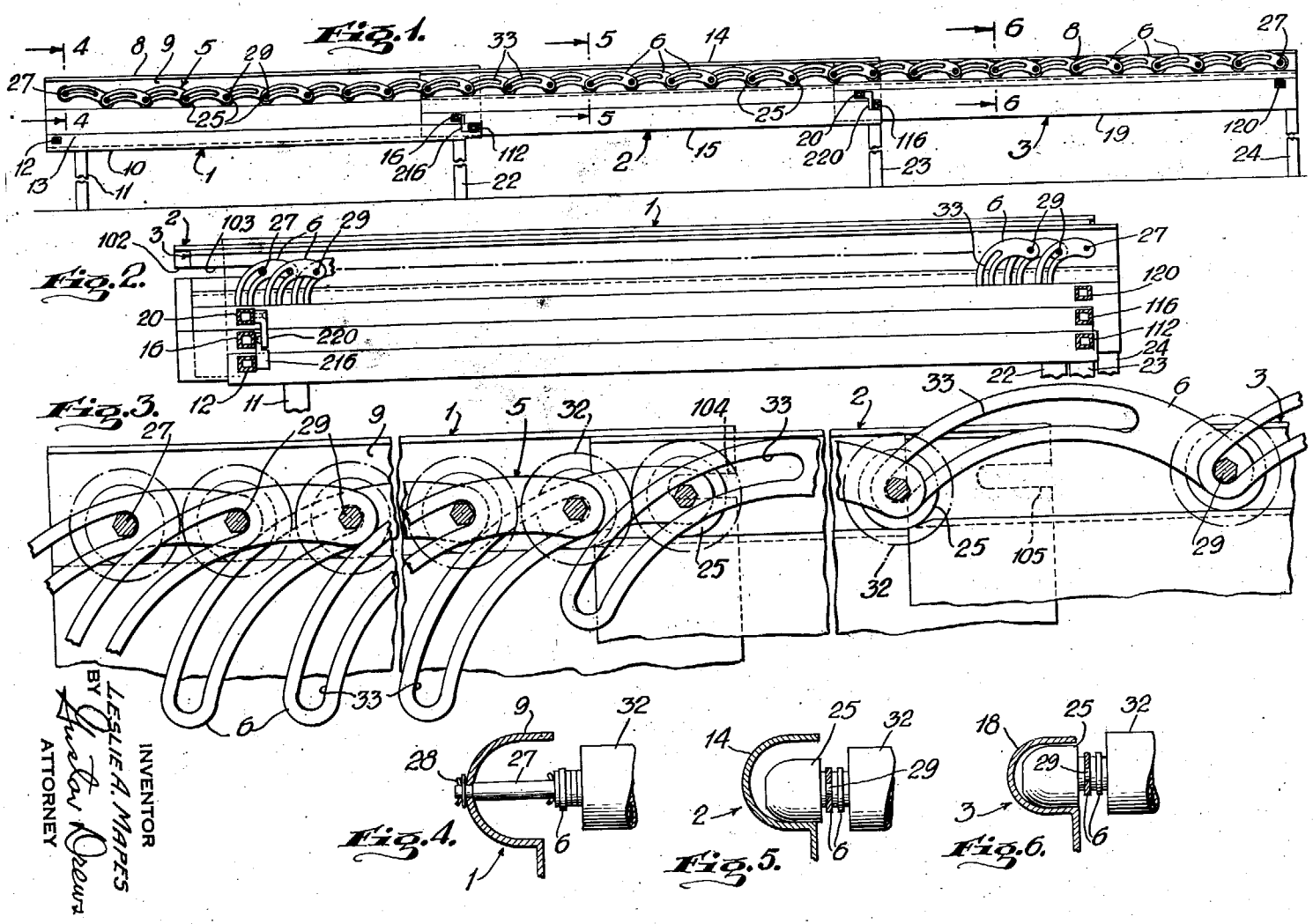
INVENTOR
LESLIE A. MAPES
BY Gustav Drews
ATTORNEY May 3, 1949. L. A. MAPES Re. 23,107

EXTENSIBLE CONVEYER

2 Sheets-Sheet 2

Original Filed April 17, 1946

INVENTOR
LESLIE A. MAPES
BY Gustav Drews
ATTORNEY

Reissued May 3, 1949

Re. 23,107

UNITED STATES PATENT OFFICE 23,107

EXTENSIBLE CONVEYER

Leslie A. Mapes, Palisade, N. J.

Original No. 2,445,960, dated July 27, 1948, Serial No. 662,717, April 17, 1946. Application for reissue December 14, 1948, Serial No. 65,278

5 Claims. (Cl. 193—35)

This invention relates to conveyors in general and more especially to conveyors of the type extensively used for transferring cargo to or from a vessel, a truck or the like.

Among the objects of the present invention, it is aimed to provide an improved cargo transferring conveyor of the type used for transferring cargo to or from a vessel, truck or the like and which is characterized by cargo supporting means such as cylinders or spaced rollers which are rotatably mounted on extensible telescoping frames.

These and other features, capabilities and advantages of the invention will appear from the subjoined detail description of specific embodiments thereof illustrated in the accompanying drawings in which Fig. 1 is a longitudinal section of one embodiment of the conveyor, in extended or expanded position.

Fig. 2 is a slightly enlarged section of the conveyor illustrated in Fig. 1 in collapsed or closed position.

Fig. 3 is a fragmental longitudinal section on a larger scale than that shown in Fig. 2, showing the conveyor partly collapsed or contracted.

Fig. 4 is a section on the line 4—4 of Fig. 1.

Fig. 5 is a section on the line 5—5 of Fig. 1.

Fig. 6 is a section on the line 6—6 of Fig. 1.

Figure 7:
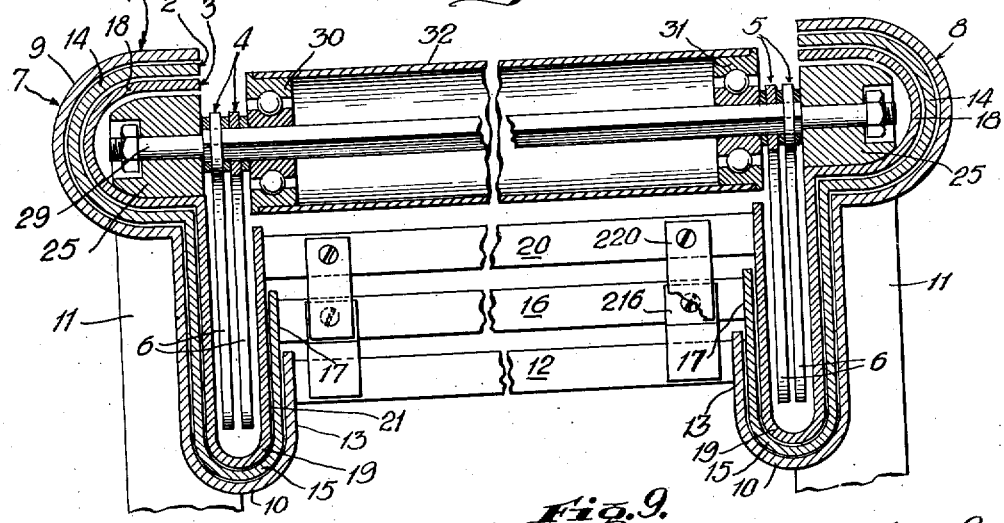
Fig. 7 is a transverse section on a larger scale than that shown in Fig. 3 showing the three telescoping members nested within one another.

In the embodiment shown in Figs. 1 to 7, inclusive, there is shown a conveyor consisting of a plurality of sections, three sections, 1, 2 and 3 being shown in the present instance. In their most contracted or collapsed position the three sections nest into one another, see Figs. 2 and 7, with the section 1 in the outermost position, the section 3 in the innermost position, and the section 2 disposed between the two sections 1 and 3. The telescoping sections 1, 2 and 3 constitute the rigid structural portions which are mounted to slide into one another and connected by two collapsible chains 4 and 5, each consisting of a plurality of links 6 which are slot and pin connected to one another.

The sections 1, 2 and 3 are substantially identical to one another, with the exception that their dimensions vary to facilitate telescoping them into one another into the nested position shown in Fig. 2. As an instance, the outermost section 1 has two side casings 7 and 8, each having an upper U-shaped curved channelled portion 9, and a downwardly extending U-shaped curved portion 10 with the supports 11 secured near the free ends of the section 1 and extending downwardly from the U-shaped members 9 and 10, see Figs. 1 and 7. At the outermost ends of the section 1, crossbars 12 and 112 are provided extending from the inner webs 13 of the U-shaped portions 10, see Fig. 7.

Sections 2 and 3, as aforesaid, are substantially identical to section 1, except that for the section 2, the upper U-shaped channelled portions 14 are smaller than the U-shaped portions 9 to fit into the channel thereof, and that the downwardly extending U-shaped portions 15 are smaller than the upwardly extending portions 10 to fit into the same, and that the crossbars 16 and 116 connecting the inner webs 17 and the U-shaped portions 15 are longer than the crossbars 12 and 112, see Fig. 3.

In turn, for the section 3, the upper U-shaped channelled portions 18 are smaller than the U-shaped channelled portions 14 to fit into the same, the downwardly extending portions 19 are smaller than the downwardly extending portions 15 to fit into the same, and the cross bars 20 and 120 connecting the webs 21 of the U-shaped portions 19 to one another are longer than the crossbars 16 and 116, see Fig. 3.

As shown in Fig. 1, the casings 7 and 8 of the section 1 also have legs or supports 22 extending downwardly from the inner end thereof, substantially identical in length and shape to the legs 11. The end of the section 2 which extends beyond the section 1 is provided with legs or supports 23 extending downwardly from the casings 14 thereof.

In turn, the free end of the section 3 is provided with legs or supports 24 extending downwardly from the casings 19.

In the present instance, the crossbar 16 is provided with a downwardly extending lug 216 to be engaged by the crossbar 112 in the position shown in Fig. 1 to limit the outward movement of the section 2, and the crossbar 20 is provided with a downwardly extending lug 220 to be engaged by the crossbar 116 in the position shown in Fig. 1 to limit the outward movement of the section 3. In their collapsed position, in turn, the lug 216 will engage the cross bar 12 to limit the inward movement of the section 2 and the lug 220 will engage the lug 216 on the crossbar 16 to limit the inward movement of the section 3.

The portions 9, 14 and 18 are formed U-shaped to provide longitudinally extending channels or chambers for the shaft supporting elements shown illustratively in the form of rollers 25 and the portions 10, 15 and 19 are similarly U-shaped to form chambers to accommodate the free ends of the links 6 when the sections 1, 2 and 3 are telescoped or nested into one another in collapsed position, that shown in Fig. 7.

At the ends of the chains 4 and 5, there are provided, see Figs. 1 and 4, the shafts 27. The ends of the shaft 27 at one end of the chains 4 and 5 extend through the U-shaped portions 9 and have at their outer ends suitable securing means, such as the cotter pins 28. Similarly, the ends of the shaft 27 at the other ends of the chains 4 and 5 extend through the ends of the U-shaped portions 18 at the free end of the section 3 and have securing means, such as the cotter pins 28, secured thereto, see Fig. 4. Intermediate the shafts 27, there are provided the rollers 25, see Figs. 5 and 6, which are rotatably mounted on the ends of the shafts 29, which shafts 29, however, are not journalled in any of the U-shaped portions 9, 14, and 18, the rollers 25 being free to move or roll in the chambers formed in the U-shaped portions 9, 14 and 18. The shafts 29, Fig. 7, have mounted thereon the ball bearing units 30 and 31 to which in turn are connected the ends of the cylinders 32 so that the cylinders 32 in this embodiment may constitute the cargo supports and are freely rotatable on the shafts 29 through the ball bearing units 30 and 31.

The portions of the shafts 29 disposed between the ends rollers 25 and the portions of the shafts 27 extending from link 6 to link 6 preferably are hexagonal, see the cross section of the shafts 27 and 29 in Figs. 3 and 7.

The chains 4 and 5 are substantially identical to one another, each having the same number of links. In the present instance, the links 6 are provided with extended elongated arcuate slots 33 which extend from the left hand ends of the links 6 over two-thirds of the lengths of the links, and at the right hand end of the links 6, each link is provided with a hexagonal opening to receive a hexagonal portion of a shaft 27 or 29. In assembled position, the successive links 6 are staggered relative to one another so that the first link 6 at the left hand end of Figs. 1 and 3 has the first shaft 27 extend through its slot 33 and its right hand end fixedly mounted on the second shaft 29, which shaft 29, however, extends through the slot 33 of the second link 6, with the first, third and odd numbered links 6 in alinement with one another, and to the rear in Fig. 1, while the second, fourth and even numbered links 6 are in alinement with one another and to the front of the odd numbered links 6 in Fig. 1.

In the open or extended position of the sections 1, 2 and 3, Fig. 1, the left hand ends of the slots 33 of the links 6 will engage the shafts 29 and the shaft 27 at the left hand end of section 1, while in the collapsed or contracted position, the right hand ends of the slots 33 of the links 6 will engage the shafts 29 and the shaft 27 at the left hand end of section 1, see the left hand end of Fig. 3 when the free ends of the links 6 will extend down into the U-shaped chambers of the U-shaped portions 19 of section 3, see Fig. 7.

It will thus be seen that the rotatably mounted cylinders 32 form cargo supporting rollers and, taking each with its shaft 29 and shaft supporting elements 25 at either end thereof, there is formed a cargo supporting unit which is movable longitudinally with respect to the side casings 8 and 9 and the other such units, the supporting elements 25 being movably mounted in the channels of casings 8 and 9. The links 4 and 5 interconnect the adjacent units of the series of such cargo supporting units extending along the conveyor, limiting the movement of such units apart and permitting their movement toward each other from their most widely spaced position.

The hexagonal cross section of the shafts 27 and 29 by being fixed to one pair of links, one link 6 of the chain 4 and one link 6 of the chain 5, will maintain these two links 6 in alinement with one another and thereby maintain the two chains 4 and 5 in alinement with one another. Since the cylinders 32 depend for rotation relative to the shafts 27 and 29 upon the ball bearing units 30 and 31, obviously the inner collars of the ball bearing units 30 and 31 may be fixed to the hexagonal portions of the shafts 27 and 29 without interfering with the rotation of the cylinders 32.

In order to clear the ends of the shaft 27 at the left hand end of section 1, when the sections 1, 2 and 3 are telescoped or moved into collapsed position, the left hand ends of the sections 2 and 3 are provided with the longitudinally extending slots 102 and 103. Similarly, in order to clear the ends of the shaft 27 at the right hand end of section 3, when the sections 1, 2 and 3 are in telescoped or contracted position, the right hand ends of the sections 1 and 2 are preferably provided with longitudinally extending slots, such as the slots 104 and 105 in the sections 2 and 3.

Figure 8:
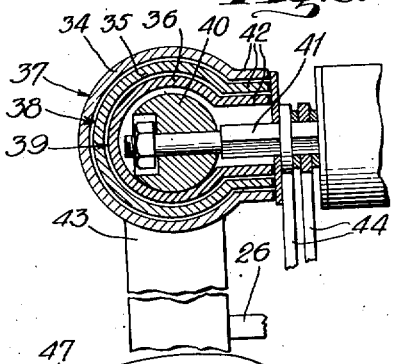
Fig. 8 is a fragmental section similar to Fig. 3 of a second embodiment of the invention.

The embodiment shown in Fig. 8, differs from the embodiment shown in Figs. 1, 2 and 3 primarily in that the skirts or downwardly extending U-shaped portions 10, 15 and 19 are omitted, as well as the crossbars 12, 16 and 20, and the end members 34, 35 and 36 of the sections 37, 38 and 39 have shaft supporting elements or rollers 40 supporting the ends of the shafts 41. As an instance, here the rollers 40 are substantially spherical instead of mainly cylindrical as is the case with the rollers 25 of the embodiment shown in Fig. 7, and these substantially sperical rollers 40 are anchored to travel in the channels or chambers formed in the end members 34, 35 and 36 by virtue of the configuration of the end members 34, 35 and 36 having restricted neck portions 42. Furthermore, the chambers in the end members 34, 35 and 36 preferably have a diameter greater than the diameter of their restricted neck portions 42, and also greater than the diameter of the rollers 40 to enable the rollers 40 freely to rotate in said chambers.

Preferably the end members 34, 35 and 36 have legs 43, such as the legs 11, 22, 23 and 24 of the embodiment illustrated in Fig. 1 connected to one another by the crossbars 26 similar to the crossbars 12, 16 and 60, but clearing the free ends of the links 44 in contracted position whereby the pairs of end members 34, 35 and 36 are anchored to one another.

In this embodiment, while the shafts 41 preferably are rounded to receive the rollers 40, between the rollers 40 these shafts 41 are also hexagonal in cross section so that the links 44 are mounted on the shafts 41 in the manner illustrated and described with regard to the embodiment of Fig. 1. In collapsed position, however, the free ends of the links 44 will hang in space and not be enclosed as in the case with the links 6 of the embodiment illustrated in Fig. 7.

Figure 9:
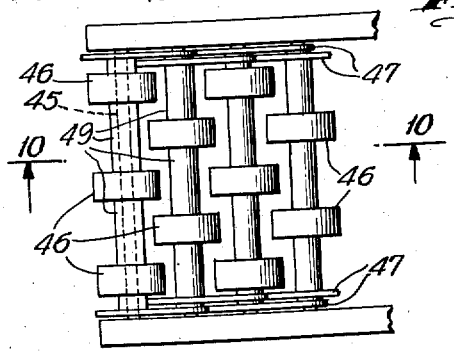
Fig. 9 is a fragmental plan of a further embodiment of the invention.
Figure 10:
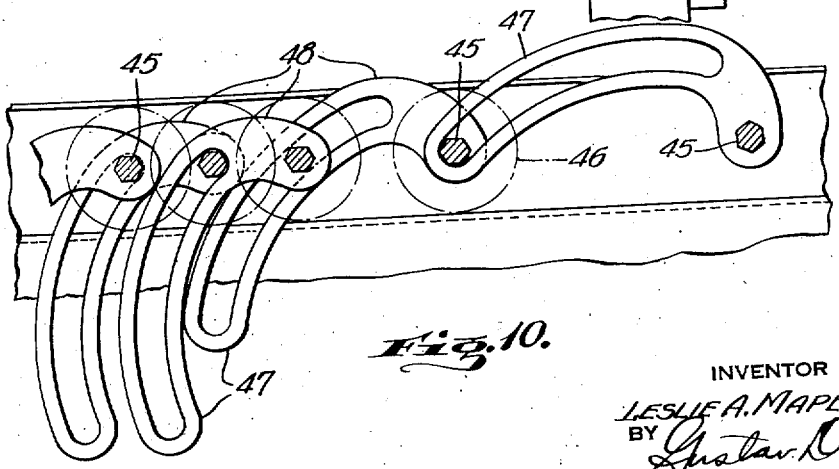
Fig. 10 is a fragmental enlarged section on the line 10—10 of Fig. 9.

The embodiment illustrated in Figs. 9 and 10 differs from the embodiment shown in Fig. 1 in another respect. In this embodiment instead of the cylinders 32 forming the cargo supporting means, the shafts 45 are provided with rollers or collars 46 which are staggered relative to one another, see particularly Fig. 9 where the first, third and odd numbered shafts 45 are provided with three collars 46, while the second, fourth and even numbered shafts are provided with two collars 46 which nest into one another. When the collars 46 are used, the shafts 45 obviously may be disposed closer to one another in collapsed position of the several sections where each link 47 may have a sharp bend 48, if the space between successive shafts 45 in open or expanded position should approach the space between the shafts 29 of the embodiment shown in Fig. 3, all other dimensions being substantially equal.

It is obvious that various changes and modifications may be made to the details of construction without departing from the general spirit of the invention as set forth in the appended claims.

I claim:

1. The combination of a plurality of sections telescopically slidable into one another, each section including a pair of side casings, crossbars connecting each pair of side casings to one another, cargo supporting rotatable means, shafts operably associated with said rotatable means, rollers at the ends of said shafts mounted in said side casings, and a pair of chains for operatively connecting said shafts to one another, each chain including links secured at one end to one of said shafts and slidably mounted on an adjacent shaft, the ends of the chains being connected to the outer ends of the end sections, said chains enabling said sections to be telescoped into one another in closed position, and also to be extended into expanded or open position.

2. In a conveyor, the combination of a plurality of sections, each section including a pair of side casings, the side casings of the successive sections on each side forming a set telescopically slidable into one another each of said side casings having an upper laterally extending U-shaped portion and a downwardly extending U-shaped portion, means connecting each pair of side casings to one another, cargo supporting rotatable means, shafts operatively associated with said rotatable means, rollers on the ends of said shafts being rotatably mounted in the laterally extending U-shaped portions, and chains connected at their ends to the free ends of the end side casings, said chains including links, each link being connected at one end to a shaft and having a slot to slidably receive a succeeding shaft, the slots in said links cooperating with said shafts to enable said sections to be telescoped into one another in closed position when said links will be suspended in said downwardly extending U-shaped portions, the slots also cooperating with said shafts to enable said sections to be extended into expanded or open position.

3. In a conveyor, the combination of a plurality of sections, each section including a pair of side casings, the side casings of the successive sections on each side forming a set telescopically slidable into one another, each of said side casings having an upper laterally extending U-shaped portion and a downwardly extending U-shaped portion, crossbars connecting each pair of side casings to one another, cargo supporting rotatable means, shafts operatively associated with said rotatable means, rollers on the ends of said shafts being rotatably mounted in the laterally extending U-shaped portions, chains connected at their ends to the free ends of the end side casings, said chains including links each link being connected at one end to a shaft and having a slot to slidably receive a succeeding shaft, the slots in said links cooperating with said shafts to enable said sections to be telescoped into one another in closed position when said links will be suspended in said downwardly extending U-shaped portions, the slots also cooperating with said shafts to enable said sections to be extended into expanded or open position, and stops on some of the crossbars engaging adjacent crossbars of adjacent sections in expanded position and engaging other adjacent crossbars of adjacent sections in closed position to determine the open and closed position of the sections.

4. In a conveyor, the combination of a plurality of sections telescopically slidable into one another, each section including a pair of channelled side casings, each said casing of each pair being slidable into the channel of the adjoining casing toward one end of said conveyor in telescoping said sections; means interconnecting each pair of side casings; a series of roller units each comprising a cargo supporting roller, a shaft operably associated with said roller, and supporting elements one at each end of said shaft on which said shaft ends are supported, said elements being mounted for longitudinal movement in the channels of said side casings and being so proportioned as to be capable of longitudinal movement in the smallest of said channels; and linkage means interconnecting the adjacent ones of said roller units limiting movement apart and permitting movement toward each other of said roller units; the ends of said series being connected to the outer ends of the sections; said linkage means enabling said sections to be telescoped into one another in closed position, and also to be extended into expanded or open position.

5. In a conveyor, the combination of a plurality of sections telescopically slidable into one another, each section including a pair of U-channelled side casings, the channels of adjacent, end to end sections being progressively larger toward one end of the conveyor whereby each said casing of each pair is slidable into the channel of the adjoining casing toward one end of said conveyor in telescoping said sections; means interconnecting each pair of said casings; a series of roller units each comprising a cargo supporting roller, a shaft operably associated with said roller, and supporting elements one at each end of said shaft on which said shaft ends are supported, said elements being mounted for longitudinal movement in the channels of said side casings and being so proportioned as to be capable of longitudinal movement in the smallest of said channels; and links interconnecting said roller units each said link being slidably associated with one of said units limiting movement apart and permitting movement toward each other of said roller units; the ends of said series being connected to the outer ends of the sections; said links enabling said sections to be telescoped into one another in closed position, and also to be extended into expanded or open position.

LESLIE A. MAPES.

No references cited.